(12) United States Patent
Mitsugi

(10) Patent No.: US 10,985,573 B2
(45) Date of Patent: Apr. 20, 2021

(54) POWER GENERATION SYSTEM

(71) Applicant: TOSHIBA MITSUBISHI-ELECTRIC INDUSTRIAL SYSTEMS CORPORATION, Chuo-ku (JP)

(72) Inventor: Yasuaki Mitsugi, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 16/614,949

(22) PCT Filed: Sep. 11, 2017

(86) PCT No.: PCT/JP2017/032711
§ 371 (c)(1),
(2) Date: Nov. 19, 2019

(87) PCT Pub. No.: WO2019/049380
PCT Pub. Date: Mar. 14, 2019

(65) Prior Publication Data
US 2020/0212682 A1 Jul. 2, 2020

(51) Int. Cl.
*H02J 3/46* (2006.01)
*H02J 3/38* (2006.01)
*H02M 1/42* (2007.01)

(52) U.S. Cl.
CPC .............. *H02J 3/46* (2013.01); *H02J 3/381* (2013.01); *H02M 1/4208* (2013.01); *H02J 3/38* (2013.01);
(Continued)

(58) Field of Classification Search
CPC .......... H02J 3/46; H02J 3/381; H02M 1/4208
See application file for complete search history.

(56) References Cited

U.S. PATENT DOCUMENTS 9,948,211 B2 * 4/2018 Baronian .............. H02M 7/539
10,355,487 B2 * 7/2019 Terazono ................. H02J 3/32
(Continued)

FOREIGN PATENT DOCUMENTS

| JP | 2012-44863 A | 3/2012 |
|---|---|---|
| JP | 2013-207862 A | 10/2013 |
| JP | 2017-131024 A | 7/2017 |

OTHER PUBLICATIONS

International Search Report dated Oct. 3, 2017 in PCT/JP2017/032711 filed on Sep. 11, 2017.
(Continued)

*Primary Examiner* — Daniel Cavallari
*Assistant Examiner* — Kalu Kelly Emeaba
(74) *Attorney, Agent, or Firm* — Xsensus LLP

(57) ABSTRACT

A power generation system includes a plurality of photovoltaic cell panels for outputting DC power, a plurality of inverters for converting DC power into AC power, and a high-order device for communicating with the plurality of inverters. The high-order device is configured to acquire a predetermined power factor, and transmit a command value to each of the plurality of inverters so that the power factor corresponding to the predetermined power factor is achieved by a total output of the plurality of inverters. The high-order device is configured so as to determine a specific inverter that has room to increase the amount of reactive power output from among the plurality of inverters, to transmit a reactive power increasing command value for increasing reactive power to the specific inverter.

1 Claim, 4 Drawing Sheets

(52) U.S. Cl.
    CPC ............... *H02J 3/466* (2020.01); *H02J 3/472* (2020.01); *H02J 2203/00* (2020.01); *H02J 2300/00* (2020.01); *Y02E 40/00* (2013.01)

(56) References Cited

U.S. PATENT DOCUMENTS

| | | | |
|---|---|---|---|
| 2008/0106099 A1 | 5/2008 | Ichinose et al. | |
| 2010/0102560 A1 | 4/2010 | Ichinose et al. | |
| 2011/0187109 A1 | 8/2011 | Ichinose et al. | |
| 2012/0098346 A1* | 4/2012 | Garrity | H02J 3/383 307/82 |
| 2013/0250635 A1* | 9/2013 | Sivakumar | H02J 3/383 363/71 |
| 2014/0001875 A1* | 1/2014 | Nahidipour | H02J 50/10 307/104 |
| 2014/0003103 A1* | 1/2014 | Aaltio | H02H 3/08 363/56.03 |
| 2014/0009988 A1* | 1/2014 | Valiani | H02M 7/53875 363/131 |
| 2014/0015326 A1* | 1/2014 | Eberhardt | H02J 3/383 307/82 |
| 2014/0021793 A1* | 1/2014 | Chu | H02J 1/10 307/82 |
| 2014/0049229 A1* | 2/2014 | Li | H02J 3/381 322/39 |
| 2014/0070619 A1* | 3/2014 | Fornage | H02J 3/00 307/82 |
| 2014/0078791 A1* | 3/2014 | Gurudasani | H02M 7/4807 363/37 |
| 2014/0103726 A1* | 4/2014 | Martin | H02M 1/36 307/65 |
| 2014/0185344 A1* | 7/2014 | Fornage | H02J 3/383 363/95 |
| 2014/0285023 A1* | 9/2014 | Garg | G05F 1/67 307/82 |
| 2017/0149373 A1* | 5/2017 | Aghatehrani | H02J 3/46 |
| 2017/0214337 A1* | 7/2017 | Baronian | H02J 3/385 |
| 2018/0054057 A1* | 2/2018 | Xu | H02M 7/49 |
| 2018/0102720 A1* | 4/2018 | Barker | F03D 9/255 |
| 2018/0138713 A1* | 5/2018 | Matsuoka | H02J 3/381 |
| 2019/0148977 A1* | 5/2019 | Kuroda | H02J 13/00 700/286 |

OTHER PUBLICATIONS

Japanese Notice of Reasons for Refusal dated Jan. 14, 2021 in Japanese Application No. 2019-540740.

\* cited by examiner

POWER GENERATION SYSTEM

TECHNICAL FIELD

This application relates to a power generation system.

BACKGROUND

Conventionally, as disclosed in, for example, Japanese Patent Application Laid-Open No. 2013-207862, a power generation system including a plurality of photovoltaic power generating devices is known. The conventional power generation system includes an output suppression management device that individually suppresses an output of each of the plurality of photovoltaic power generating devices.

In order to suppress surplus power, an output of the photovoltaic power generation may be suppressed. In the art according to this publication, it is important to suppress the output of each photovoltaic power generating device not uniformly but individually. In the conventional power generation system described above, an output limit value is set to a plurality of inverters included in each photovoltaic power generating device, thereby individually adjusting an amount of power generated.

CITATION LIST

Patent Literature

[PTL 1] JP 2013-207862 A

SUMMARY

Technical Problem

In a power generation system connected to an electric power grid, a power factor of the entire power generation system is controlled in order to adjust a power factor at a grid connection point. The power factor at the grid connection point is generally given to a high-order device of the power generation system. The high-order device may communicate with a plurality of inverters in the power generation system.

The high-order device adjusts active power and reactive power of the power generation system to comply with a given power factor command value. In the conventional power generation system described above, although an amount of power generated is individually controlled, its power factor is not mentioned. Therefore, it can be inferred that the power factor is set to be the same in all the inverters in the conventional power generation system.

A photovoltaic cell panel has a certain area. In large scale photovoltaic systems, photovoltaic panels are entirely installed in a large area. An amount of solar radiation is not always constant, and the amount of solar radiation may vary depending on places. When the solar radiation amount of a part of the photovoltaic cell panels decreases due to the solar radiation amount variation, a decrease in the power generation amount occurs in only the part of the photovoltaic cell panels.

In an inverter connected to the photovoltaic cell panel in which the amount of generated power decreases, the amount of generated power becomes small as compared to its inverter capacity. That is, there occurs an inverter having a surplus capacity. The inventor of the present application has found a problem that if the power factor is set to be the same in all the inverters in such a state, opportunity to increase the active power is lost.

It is an object of the present application to provide a power generation system capable of increasing active power of an entire system.

Solution to Problem

A power generation system according to the present invention includes:

a plurality of photovoltaic cell panels for outputting DC power;

a plurality of inverters for converting the DC power into AC power; and a high-order device for communicating with the plurality of inverters, wherein the high-order device is configured to transmit a command value to each of the plurality of inverters so that a predetermined power factor set in advance is achieved by a total output of the plurality of inverters, wherein each of the plurality of inverters is configured to control an output amount of active power and an output amount of reactive power based on the command value which is received, wherein the high-order device is configured to transmit, to a specific inverter having room to increase the output amount of reactive power among the plurality of inverters, a reactive power increasing command value for increasing reactive power, and to transmit, to at least one of the plurality of inverters other than the specific inverter, an active power increasing command value for increasing active power and decreasing reactive power.

Advantageous Effects of Invention

According to the power generation system described above, in response to the specific inverter increasing reactive power, another inverter can acquire room to reduce reactive power and can increase active power. As a result, active power of the entire power generation system can be increased.

DESCRIPTION OF EMBODIMENTS

Operation Principle of Embodiments.

Figure 1:
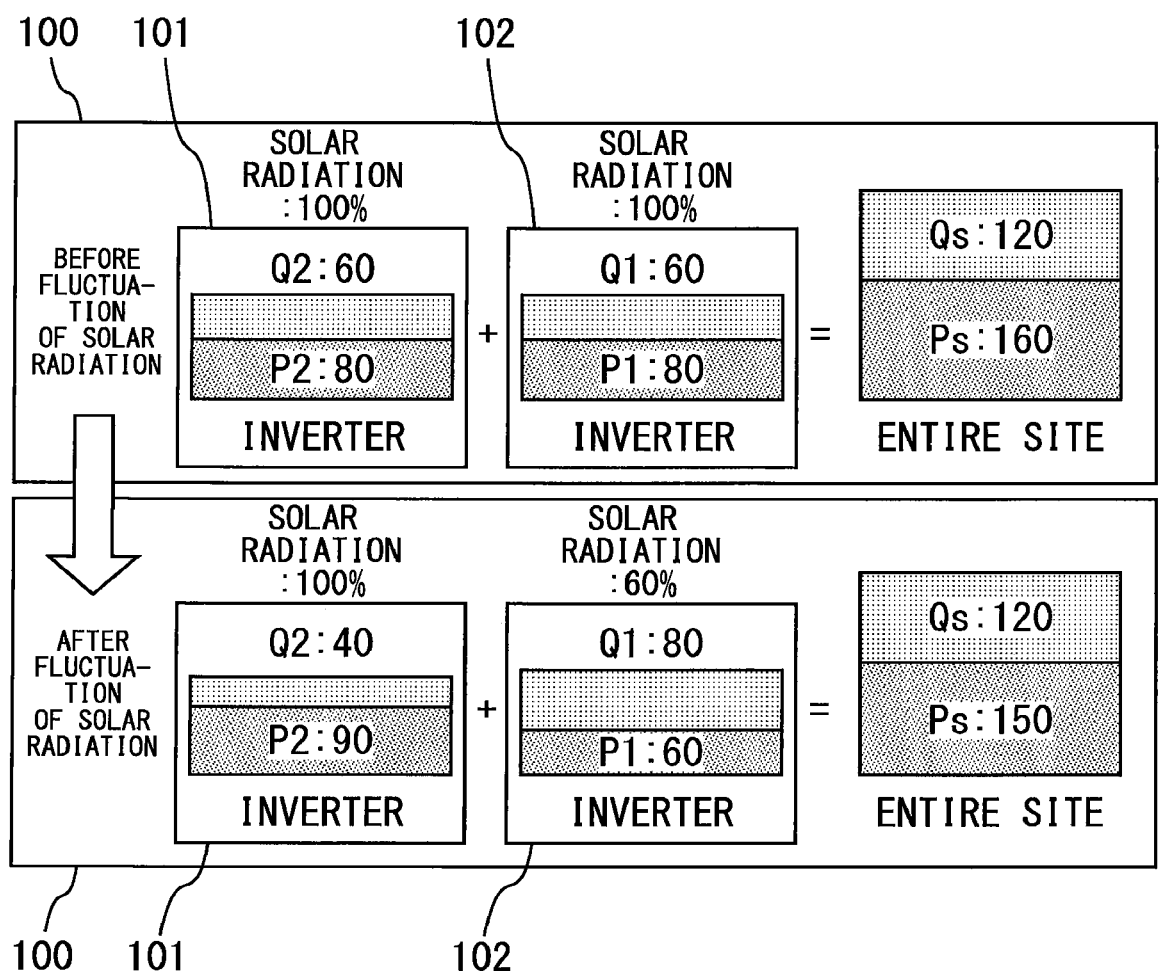
FIG. 1 is a diagram for explaining an operation principle of a power generation system according to the embodiment.
Figure 2:
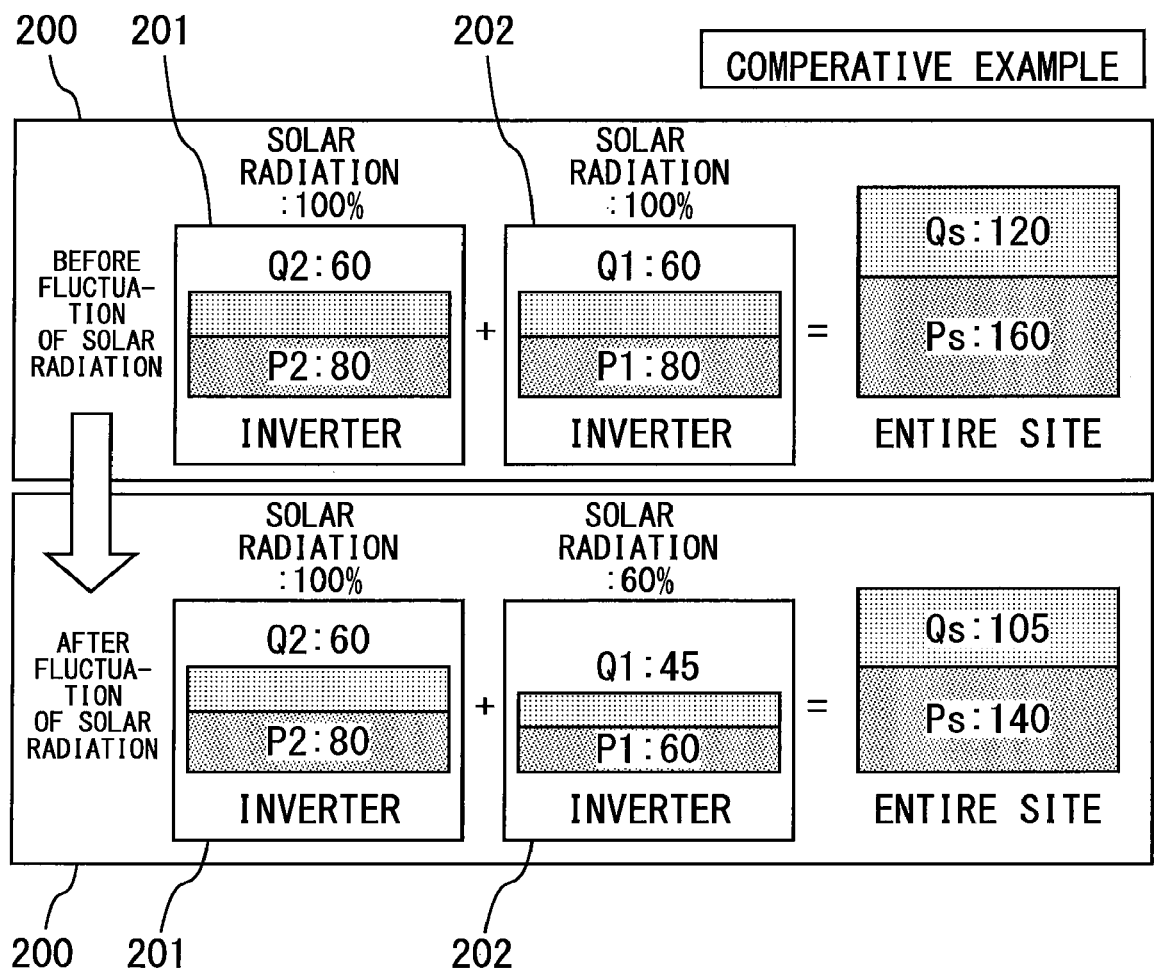
FIG. 2 is a diagram for explaining an operation principle of a power generation system according to a comparative example with respect to the embodiment.

First, an operation principle of a power generation system according to the embodiment will be described with reference to FIGS. 1 and 2. FIG. 1 is a diagram for explaining the operation principle of a power generation system 100 according to the embodiment. FIG. 2 is a diagram for explaining an operation principle of a power generation system 200 according to a comparative example with respect to the embodiment.

FIGS. 1 and 2 illustrate operations of the power generation systems 100, 200, respectively, before and after a solar radiation fluctuation occurs. The power generation systems 100 and 200 in FIGS. 1 and 2 are photovoltaic power generation systems. For the sake of convenience, photovoltaic cell panels are not shown, and inverters 101, 102, 201, and 202 for converting DC power from the photovoltaic cell panels are only shown.

First, the comparative example of FIG. 2 will now be described. The power generation system 200 according to the comparative example includes the inverter 201 and the inverter 202. Capacities of the inverter 201 and the inverter 202 are both 100 kVA. A total capacity of the power generation system 200 is 200 kVA. In the power generation system 200 according to the comparative example, the inverters 201 and 202 are set to the same power factor.

It is assumed that amounts of solar radiation to the photovoltaic cell panels connected to the inverters 201 and 202 are 100% before the amount of solar radiation fluctuations. At this time, it is assumed that both of the inverters 201 and 202 are driven with active power P=80 [kW] and reactive power Q=60 [kvar]. An entire site of the power generation system 200 outputs active power Ps=160 [kW] and reactive power Qs=120 [kvar].

Next, in the comparative example of FIG. 2, a description will be given of a case where there occurs a fluctuation in the amount of solar radiation. It is assumed that, after the fluctuation in the solar radiation, the photovoltaic cell panel connected to the inverter 201 generates electricity with 100% solar radiation, while the solar radiation amount for the photovoltaic cell panel connected to the inverter 202 decreases to 60%. In the power generation system 200 according to the comparative example, the power factor is controlled to be kept at the same value in all the inverters 201 and 202 before and after the solar radiation fluctuation occurs.

The inverter 201 is driven so as to output active power P=80 [kW] and reactive power Q=60 [kvar]. The inverter 202 is driven so as to output active power P=60 [kW] and reactive power Q=45 [kvar]. The entire site of the power generation system 200 outputs active power Ps=140 [kW] and reactive power Qs=105 [kvar].

However, the inventor of the present application focused on the following points as problems of the comparative example. In the comparative example, in the inverter 202 connected to the photovoltaic cell panel in which the amount of generated power is reduced, the amount of generated power is reduced relative to its inverter capacity. That is, there occurs a surplus capacity in the inverter 202. Therefore, the embodiment utilizes an opportunity to increase active power of the inverter 202 having the surplus capacity by the following method.

The power generation system 100 according to the embodiment shown in FIG. 1 includes the inverter 101 and the inverter 102. Capacities of the inverter 101 and the inverter 102 are both 100 kVA as in the comparative example. As in the comparative example, a capacity of an entire site of the power generation system 100 is 200 kVA. In the embodiment shown in FIG. 1, power generation is performed in the same manner as in the comparative example of FIG. 2 before the solar radiation amount changes.

On the other hand, in the embodiment shown in FIG. 1, after the fluctuation of the amount of solar radiation occurs, the inverter 102 which experiences a decrease in the amount of solar radiation performs an operation different from that of the comparative example. In the embodiment, the inverter 102 is controlled to increase reactive power Q. As a result, in the inverters 102 according to the embodiment, although the output amount of active power P is 60 [kW] as in the comparative examples, the output amount of reactive power Q is increased to 80 [kvar].

Since the inverter 102 outputs more reactive power Q, the inverter 101 can reduce reactive power Q. As a result, reactive power Qs is set to 120 [kvar] and active power Ps is set to 150 [kW] in the entire sites of the power generation systems 100.

Comparing magnitudes of active power Ps of entire sites, active power Ps in the embodiment of FIG. 1 is larger than that in the comparative example of FIG. 2. Since active power Ps of the entire site in the embodiment is larger than that in the comparative example under the same solar radiation condition, a larger amount of a sold electricity amount can be expected in the embodiment.

Numerical values shown in FIG. 1 are examples for convenience of description. In an actual power generation system, strictly speaking, active power P and reactive power Q are specified for inverters 11 to 15 (shown in FIG. 3) within a range in which a power factor of an entire site does not change before and after the solar radiation fluctuation. A power factor $\phi_{S1}$ of the entire site prior to the solar radiation fluctuations in FIG. 1 is calculated as follows.

$$\phi_{S1} = P/(P^2 + Q^2)^{1/2}$$
$$= 160/(160^2 + 120^2)^{1/2}$$
$$= 0.8$$

Following calculation may be used to calculate a condition in which a power factor $\phi_{S2}$ of the entire site after the solar radiation fluctuation in FIG. 1 is equal to the power factor $\phi_{S1}$.

$$\phi_{S2} = P/(P^2 + Q^2)^{1/2}$$
$$= 150/(150^2 + 112.5^2)^{1/2}$$
$$= 0.8$$

In order to set reactive power Q of the entire site to 112.5, for example, reactive power Q outputted from the inverter 101 may be set to 40 [kvar], while reactive power Q outputted from the inverter 102 may be set to 72.5 [kvar].

Specific System Example of Embodiments.

Next, a specific power generation system 10 according to the embodiment will now be described with reference to FIGS. 3 to 5.

Figure 3:
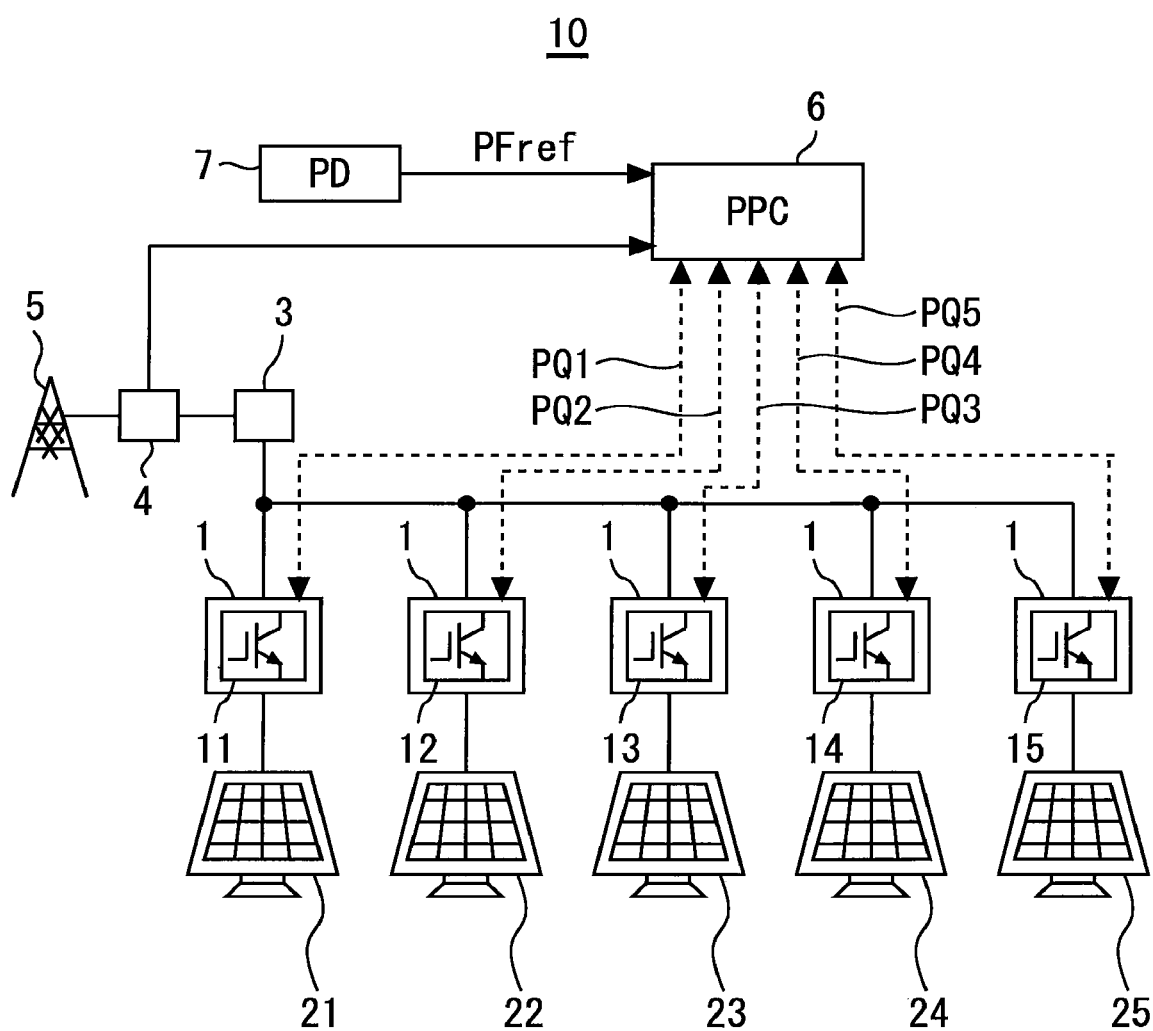
FIG. 3 is a diagram showing a power generation system according to the embodiment.

FIG. 3 is a diagram showing the power generation system 10 according to the embodiment. The power generation system 10 performs grid connection with an electric power grid 5. The power generation system 10 includes a plurality of power conditioners 1, a plurality of photovoltaic cell arrays 21 to 25, a transformer 3, a site meter 4, a power plant controller 6 which is a high-order device, and a power distributor 7.

Hereinafter, the site meter is also referred to as "SM", the power plant controller is also referred to as "PPC", and the power distributor is also referred to as "PD". The SM 4 measures a parameter related to an output power of the power generation system 10. The parameter related to the output power includes active power (kW), reactive power (var), an output AC voltage (V), a frequency (Hz), and a power factor PF, which are outputted from a whole. The SM 4 sends these parameters to the PPC 6.

Each of the photovoltaic cell arrays 21 to 25 includes a plurality of photovoltaic cell panels for outputting DC power. Each of the plurality of power conditioners 1 includes each of the inverters 11 to 15 for converting the DC power into AC power. In the embodiment, as an example, it is assumed that the power generation system 10 includes five photovoltaic cell arrays 21 to 25 and five power conditioners 1. Since each of the power conditioners 1 includes an inverter, the power generation system 10 also includes the five inverters 11 to 15.

The power generation system 10 is provided with an "high-order command value PFref" for instructing a predetermined power factor. In the embodiment, it is assumed that the "high-order command value PFref" is inputted to the PD 7 based on an instruction from an electric power company or the like. The high-order command value PFref is given to the PPC 6 through the PD 7.

The high-order command value PFref is given in the form of a connection point power factor or an active-reactive power reference value. In the embodiment, it is assumed that the high-order command values PFref are provided in the form of the connection point power factor. The connection point power factor is a power factor to be achieved by the power generation system 10 at a grid connection point. Therefore, the content of the high-order command value PFref is a reference value of a power factor. The grid connection point is a connection point between the electric power grid 5 and the power generation system 10. The grid connection point is also referred to as POI (Point of Interconnection).

It should be noted that the high-order command value PFref may be provided as an active-reactive power reference value. The active-reactive power reference value is a value for instructing active power Ps and reactive power Qs to be outputted from the power generation system 10 as a whole.

The PPC 6 is configured to communicate with the plurality of inverters 11 to 15. The PPC 6 is configured to transmit a "low-order command value" to each of the plurality of inverters 11 to 15 so that the power factor according to the high-order command value PFref is achieved by the sum outputs of the plurality of inverters 11 to 15.

The low-order command values according to the embodiment are active-reactive power command values PQ1 to PQ5. The active reactive power command values PQ1 to PQ5 are values for instructing a magnitude of active power P and a magnitude of reactive power Q to be outputted from each of the inverters 11 to 15. Each of the plurality of inverters 11 to 15 is configured to control, upon receiving the active-reactive power command values PQ1 to PQ5, an output amount of active power P and an output amount of reactive power Q in accordance with each active reactive power command value. Technique of controlling active power P and reactive power Q of the known inverter using the active-reactive power command value is already known, and is not a new matter. Therefore, a detailed description is omitted.

The PPC 6 is configured to select a "specific inverter" among the plurality of inverters 11 to 15. The "specific inverter" is an inverter that has room to increase the output amount of reactive power Q. At least the following first and second examples can be considered as selection methods of the specific inverter.

As a first example of the specific inverter selection method, an inverter connected to a photovoltaic cell array experiencing a "decrease in the amount of received solar radiation" among the plurality of photovoltaic cell arrays 21 to 25 may be selected as a specific inverter. This first example is a method to select as the specific inverter an inverter connected to a photovoltaic cell array which experiences a "decrease in an amount of power generation" among the plurality of photovoltaic cell arrays 21 to 25. Therefore, as the first example, the specific inverter can be selected by measuring magnitudes of the DC power outputs from the plurality of photovoltaic cell arrays 21 to 25 with ammeters and voltmeters provided in the power conditioners 1.

A second example of the specific inverter selection method may be a method such that an inverter which experiences increase in an "output reactive power margin" is selected as the specific inverter. In the embodiment, the output reactive power margin is explained using a symbol "$Q_{pb}$" in the meaning of Qpossible. The output reactive power margin $Q_{pb}$ represents a maximum value of reactive power Q which each of the inverters 11 to 15 can output.

In the second example, firstly, when the amount of solar radiation fluctuates, a part of the photovoltaic cell panels experiences decrease in the amount of power generated. In an inverter connected to the photovoltaic cell panel which experiences decrease in the amount of generated power, the amount of generated power becomes small as compared to its inverter capacity. That is, there occurs an inverter having a surplus capacity. By detecting an increase in the output reactive power margin $Q_{pb}$, it is possible to specify an inverter which has such a capacity margin. Therefore, in the second example, the PPC 6 selects as the "specific inverter" an inverter having an increased reactive power margin $Q_{pb}$ among the plurality of inverters 11 to 15. The power generation system 10 according to the embodiment described with reference to FIG. 3 implements this second example.

In the embodiment, the PPC 6 is configured to acquire a magnitude of the output reactive power margin $Q_{pb}$ of each of the plurality of inverters 11 to 15. It is preferable that a specific inverter having a margin in the output of reactive power Q is accurately and early specified, and reactive power Q is extracted as much as possible from the specific inverter. In order to achieve such an object, the power generation system 10 is configured to calculate the output reactive power margin $Q_{pb}$. Since the output reactive power margin $Q_{pb}$ can be changed from time to time, it is preferable that the PPC 6 performs computation processing of the output reactive power margin $Q_pb$ in a certain short cycle.

The output reactive power margin $Q_{pb}$ is calculated by the following equation (1).

$$Q_{pb} = (S^2 - P_{DC}^2)^{1/2} - Q_{AC} \tag{1}$$

In the above equation (1), S is an inverter capacity [VA], $P_{DC}$ is DC power [W] outputted from the photovoltaic cell array and inputted to an inverter, and $Q_{AC}$ is reactive power [var] outputted from the inverter. The DC power [W] inputted to each of the inverters 11 to 15 and active power [W] outputted from each of the inverters 11 to 15 may be measured by the ammeter and the voltmeter built in the power conditioner 1.

For example, it is assumed that a total amount of power that can be generated by the photovoltaic cell array 21 is 1.0 [MW], and, in accordance therewith, a capacity of the inverter 11 connected to the photovoltaic cell array 21 is 1.0 [MVA]. It is assumed that the DC power $P_{DC}$ inputted to the inverter 11 connected to the photovoltaic cell array 21 is 0.8 [MW], and reactive power $Q_{AC}$ outputted from the inverter 11 is 0.6 [MVar]. In this case, an output reactive power margin $Q_{pb1}$ is calculated according to the following equation (2).

$$Q_{pb1} = Q_{pb} = (S^2 - P_{DC}{}^2)^{1/2} - Q_{AC} = (1.0^2 - 0.8^2)^{1/2} - 0.6 = 0.0 \text{ [Mvar]} \quad (2)$$

Similarly, output reactive power margins $Q_{pb2}$ to $Q_{pbs}$ of each of the plurality of inverters 12 to 15 are calculated. For example, when the output reactive power margin $Q_{pb5}$ increases, the PPC 6 sets the inverter 15 having the output reactive power margin $Q_{pb5}$ to the "specific inverter".

The PPC 6 is configured to transmit a "reactive power increasing command value" to the specific inverter. The reactive power increasing command value is a command value for increasing reactive power Q. On the other hand, the PPC 6 is configured so as to transmit an "active power increasing command value" to one inverter having the smallest output reactive power margin $Q_{pb}$ among the "other inverters" excluding the specific inverter among the plurality of inverters 11 to 15. The active power increasing command value is a command value for increasing active power P and decreasing reactive power Q.

For example, it is assumed that the inverter 15 among the plurality of inverters 11 to 15 experiences decrease in the solar radiation amount. In this case, the output reactive power margin $Q_{pb5}$ of the inverters 15 increases. The PPC 6 sets this inverter 15 as a "specific inverter 15". The PPC 6 sets the inverters 11 to 14 excluding the specific inverter 15 as "other inverters 11 to 14". Referring to the operation described with reference to FIG. 1 for the purpose of explanation, in FIG. 1, the inverter 102 subjected to the influence of the solar radiation amount decrease corresponds to the "specific inverter", and the inverter 101 is treated as the "other inverter".

When the PPC 6 sends the reactive power increasing command value to the specific inverter 15, the specific inverter 15 is controlled to increase reactive power Q. According to the embodiment, by increasing reactive power Q of the specific inverter 15, much of reactive power Qs required in the entire power generation system 10 can be allocated to the specific inverter 15. As a result, there is room to reduce reactive power Q of the other inverters 11 to 14.

When the PPC 6 sends the active power increasing command value to one of the other inverters 11 to 14 having the smallest output reactive power margin $Q_{pb}$, the inverter receiving the active power increasing command value increases an output amount of active power P. As a result, active power Ps of the entire power generation system 10 can be increased as much as possible while maintaining a constraint condition that the connection point power factor should be kept at a predetermined constant value. Since active power Ps in the entire power generation system 10 can be increased, an increase in a sold electricity amount can be expected. It is possible to increase active power P while maintaining a balance of reactive power Q so as to secure an amount of reactive power required at the grid connection point. At least one of the other inverters 11 to 14 can also be operated efficiently at a power factor closer to 1.0.

The number of specific inverter is not limited to one. There may be a plurality of specific inverters. For example, when the inverter 11 and the inverter 12 are selected as specific inverters, the inverters 13 to 15 may be handled as other inverters.

Detailed System Processing of Embodiment.

Figure 4:
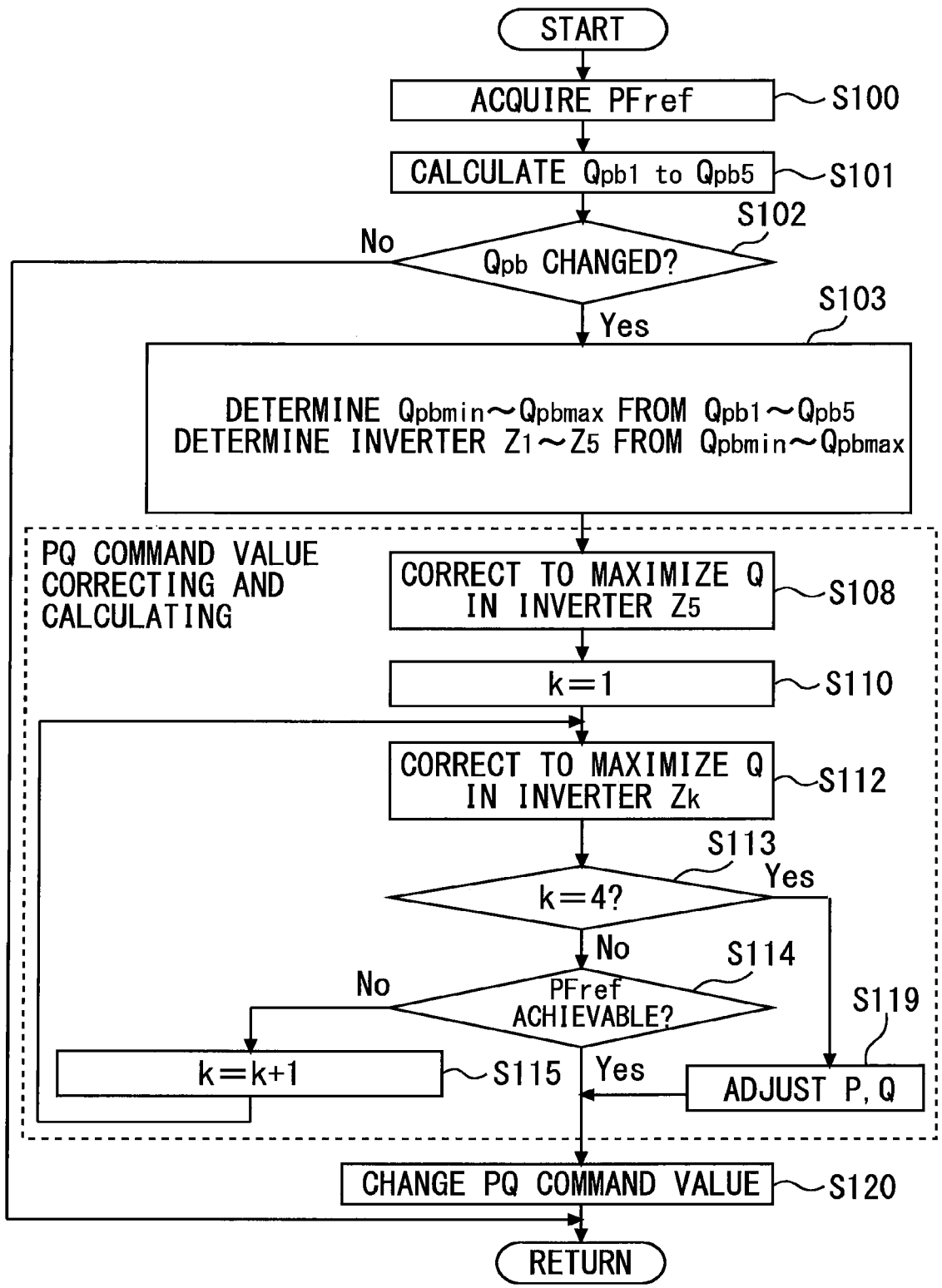
FIG. 4 is a flowchart of a routine executed in the power generation system according to the embodiment.

FIG. 4 is a flowchart of a routine executed in the power generation system 10 according to the embodiment. In the embodiment, it is assumed that, at a stage prior to executing the routines of FIG. 4, each of the inverters 11 to 15 is controlled to have a power factor specified by the high-order command value PFref, and that all of the power factors of the inverters 11 to 15 are controlled to be the same. That is, it is assumed that, before the routine of FIG. 4 is executed, the power generation system 10 performs the same operation as the power generation system 200 according to the comparative example described with reference to FIG. 2.

In the routine of FIG. 4, first, in step S100, the PPC 6 acquires the high-order command value PFref from the PD 7.

Next, in step S101, the PPC 6 calculates to acquire a magnitude of the output reactive power margin $Q_{pb}$ for each of the plurality of inverters 11 to 15. The calculation in step S102 is performed according to Equation (1) described above. The output reactive power margin of the inverter 11 is defined as $Q_{pb1}$. The output reactive power margin of the inverter 12 is defined as $Q_{pb2}$. The output reactive power margin of the inverter 13 is defined as $Q_{pb3}$. The output reactive power margin of the inverter 14 is defined as $Q_{pb4}$. The output reactive power margin of the inverter 15 is defined as $Q_{pb5}$.

Next, in step S102, it is determined whether or not at least one of the output reactive power margins $Q_{pb1}$ to $Q_{pb5}$ has been increased. If the output reactive power margin $Q_{pb1}$ to $Q_{pb5}$ is constant, the determination result of step S102 is negative. In this case, the present routine ends, and the process returns.

When a determination result of the step S102 is affirmative, then, step S103 is executed to create a list in which the plurality of inverters 11 to 15 are aligned in the order of the magnitude of the output reactive power margins $Q_{pb1}$ to $Q_{pb5}$. In step S103, the PPC 6 identifies a "largest output reactive power margin inverter" and a "smallest output reactive power margin inverter".

First, in step S103, the values of the $Q_{pb1}$ to $Q_{pb5}$ are rearranged in the order of magnitude. After rearrangement, each $Q_{pb1}$ to $Q_{pb5}$ is associated with a minimum output reactive power margin $Q_{pbmin}$, an intermediate output reactive power margin $Q_{pbmdd1}$, $Q_{pbmdd2}$, $Q_{pbmdd3}$, and a maximum output reactive power margin $Q_{pbmax}$, which are identifiers representing the magnitude of the $Q_{pb}$. However, $Q_{pbmdd1} < Q_{pbmdd2} < Q_{pbmdd3}$ is satisfied. The PPC 6 stores in advance programs to create such list in which the output reactive power margin $Q_{pb1}$ to $Q_{pb5}$ is rearranged in order of magnitude.

In the embodiment, for simplicity of explanation, it is assumed that $Q_{pb1} < Q_{pb2} < Q_{pb3} < Q_{pb4} < Q_{pb5}$ is satisfied as an example. Therefore, in the embodiment, it is assumed that $Q_{pb1} = Q_{pbmin}$, $Q_{pb2} = Q_{pbmdd1}$, $Q_{pb3} = Q_{pbmdd2}$, $Q_{pb4} = Q_{pbmdd3}$, and $Q_{pb5} = Q_{pbmax}$.

Step S103 performs processing to sort the inverters 11 to 15 in order of magnitude of $Q_{pb1}$ to $Q_{pb5}$ using $Q_{pbmin}$, $Q_{pbmdd1}$, $Q_{pbmdd2}$, $Q_{pbmdd3}$, and $Q_{pbmax}$. Specifically, inverter identifiers $Z_1$ to $Z_5$ are given to the inverters 11 to 15. The inverter identifier $Z_1$ is given to an inverter having an output reactive power margin $Q_{pb}$ associated with the minimum output reactive power margin $Q_{pbmin}$. The inverter identifiers $Z_2$ to $Z_4$ are respectively assigned to inverters having output reactive power margins $Q_pb$ associated with the intermediate output reactive power margins $Q_{pbmdd1}$ to $Q_{pbmdd3}$. The inverter identifier $Z_5$ is assigned to an inverter having an output reactive power margin $Q_{pb}$ associated with the maximum output reactive power margin $Q_{pbmax}$.

The inverter identifier $Z_5$ for the maximum output reactive power margin in the list corresponds to a "largest output reactive power margin inverter". The inverter identifier $Z_1$ for the minimum output reactive power margin $Q_{pbmin}$ in the list corresponds to a "smallest output reactive power margin inverter". As described above, in the embodiment, since the inverter identifier $Z_1$ is given to the inverter 11, the inverter identifier $Z_2$ is given to the inverter 12, the inverter identifier $Z_3$ is given to the inverter 13, the inverter identifier $Z_4$ is given to the inverter 14, and the inverter identifier $Z_5$ is given to the inverter 15 because $Q_{pb1}<Q_{pb2}<Q_{pb3}<Q_{pb4}<Q_{pb5}$ is satisfied for simplifying the explanation. The inverter 15 is set as a largest output reactive power margin inverter 15. The inverter 11 is set as a smallest output reactive power margin inverter 11.

Next, the processing proceeds to steps S108 to S115. The processing of steps S108 to S115 is a process for correcting and calculating the active-reactive power command values PQ1 to PQ5 for the plurality of inverters 11 to 15. When the correcting calculation of the active-reactive power command value is completed by the processing of steps S108 to S115, the processing proceeds to step S120, and the active-reactive power command value is actually changed. The processing of the step S120 collectively changes control of the plurality of inverters 11 to 15.

First, in step S108, the PPC 6 sets the inverter 15 to which the inverter identifier $Z_5$ is assigned to the specific inverter. In step S108, the PPC 6 corrects the active-reactive power command value PQ5 for this specific inverter 15 so as to maximize reactive power Q to the output reactive power margin $Q_{pb5}$.

Next, the processing of steps S110 to S115 performs correcting calculation with respect to the active-reactive power command values PQ1 to PQ4 of the other inverters 11 to 14 except for the specific inverter 15. The processing of step S110 to S115 includes two purposes. The first purpose is to determine appropriate candidates for the active-reactive power command value PQ1 to PQ4 so that a power factor determined by the high-order command value PFref is achieved on the entire site of the power generation system 10. The second purpose is to perform processing of increasing active power P of at least one of the other inverters 11 to 14 so as to bring the power factor closer to 1.0.

First, in step S110, a variable k is set to 1, which is an initial value. Next, in step S112, the PPC 6 adjusts an active-reactive power command value for an inverter having the inverter identifier $Z_k$ so that the inverter outputs reactive power Q as much as possible.

In step S112 for the first time after the routine is started in FIG. 4, since k=1, the inverter identifier $Z_k=Z_1$ is satisfied. Thereby, the smallest output reactive power margin inverter 11 is a target of which the active-reactive power command value is adjusted. The PPC 6 corrects the active-reactive power command value PQ1 for the inverter 11 so as to cause the inverter 11 to output reactive power Q as much as possible.

Next, in step S113, it is determined whether or not the variable k is 4. In step S116 for the first time after starting the routine of FIG. 4, the determination result of the step S116 is negative since k=1 is satisfied.

Next, in step S114, the PPC 6 determines whether or not the power factor specified by the high-order command value PFref can be achieved on the entire site of the power generation system 10 when the control content scheduled in step S112 is executed. In step S114 for the first time after the routine of FIG. 4 is started, it is scheduled that the specific inverter 15 and the inverter 11 respectively output reactive power Q to the maximum. In step S114 for the first time after the routine of FIG. 4 is started, it is determined whether or not the power factor specified by the high-order command value PFref can be achieved by the output reactive power margin $Q_{pb5}$ of the specific inverter 15 and the output reactive power margin $Q_{pb1}$ of the inverter 11. If the inverters 11 are capable of outputting all reactive power Q determined by the above difference, the determination result of step S114 is affirmative.

If the determination result of step S114 is negative, the PPC 6 increments the variable k in step S115. Thereafter, the processing loops to step S112. Since k=2 in the step S112 after the loop, the PPC 6 corrects the active reactive power command PQ2 so as to maximize reactive power Q of the inverter 12 to which the inverter identifier $Z_2$ is given.

After step S115, the processing proceeds to step S114 again. In step S114 again, the PPC 6 determines whether or not the power factor specified by the high-order command value PFref can be achieved on the entire site of the power generation system 10 when the control content scheduled in the immediately preceding step S112 is executed.

For convenience of explanation, in the embodiment, it is assumed that the power factor specified by the high-order command value PFref can be achieved in the entire power generation system 10 when the outputs of reactive power Q of the inverters 11 and 12 and the inverter 15 are maximized. In this case, the determination result of the S114 of steps is affirmative. In this case, for the other inverters 13, 14 for which reactive power Q is not scheduled to be maximized, the PPC 6 corrects the active reactive power command values PQ3, PQ4 to minimize reactive power Q and maximize active power P. Thereby, the other inverters 13 and 14 are scheduled to operate at high efficiency with a power factor close to 1.0.

Next, in step S120, the PPC 6 transmits the corrected active reactive power command values PQ1 to PQ5 to the plurality of inverters 11 to 15, respectively. The "reactive power increasing command values" in the embodiment correspond to the active-reactive power command values PQ1, PQ2 and PQ5 which are transmitted to the specific inverter 15 and the other inverters 11 and 12. The active-reactive power command value PQ3, PQ4 transmitted to the other inverters 13 and 14 corresponds to the "active power increasing command value". As a result, in each of the plurality of inverters 11 to 15, the output amount of reactive power Q and the output amount of active power P are collectively adjusted in accordance with the corrected active reactive power command values PQ1 to PQ5.

According to the detailed processing according to the embodiment described above, the power generation system 10 including the inverters 11 to 15 can smoothly correct the active-reactive power command value.

It should be noted that repeating of the processing of steps S112 to S115 causes a point of time at which k=4 is satisfied in step S113. In a case where k=4 is satisfied in step S113, the maximization correcting processing of reactive power Q has been applied to all the inverters 11 to 15 to which the inverter identifiers $Z_1$ to $Z_5$ have been given. In this case, reactive power Q is maximized in the entire site of the power generation system 10. In order to cope with such a case, step S119 is provided in the embodiment.

Step S119 adjusts a ratio of reactive power Q and active power P in the inverters 11 to 15. For example, step S119 may be such that each of the inverters 11 to 15 is controlled to have a power factor instructed by the high-order command value PFref. As a result, in step S119, the correcting operation up to steps S108 to S115 is invalidated, and the power factors of the inverters 11 to 15 are all controlled to be the same. Thereafter, the present routine ends, and the processing returns.

In reality, since the specific inverter 15 increases reactive power Q, there should be room to increase active power P for at least one of the other inverters 11 to 14. Therefore, in reality, it is expected that the determination result of step S114 becomes affirmative before k=4 is satisfied in the step S113.

In the detailed processing according to the embodiment, in steps S108, S110 and S112, the increment of reactive power Q is determined with respect to the other inverter 11 having the minimum output reactive power margin $Q_{pbmin}$, after the specific inverter 15. However, a modification may be provided in such a manner that an amount of increase in reactive power Q may be determined for another inverter 14 after the specific inverter 15, and then an amount of increase of reactive power Q may be determined in the order of the inverter 13, the inverter 12, and the inverter 11.

According to the above-described embodiment, the PPC 6 is configured so that the inverter 15 having the maximum output reactive power margin $Q_{pbmax}$ among the plurality of inverters 11 to 15 is set to the specific inverter. The reactive power increasing command value can be reliably supplied to the inverter 15 having the maximum value among the output reactive power margins $Q_{pb}$. This causes the inverter 15 having the maximum margin in an output increase amount of reactive power Q to surely output a large amount of reactive power Q. However, a modification may be provided so as to select as the specific inverter an inverter having the minimum output reactive power margin $Q_{pbmin}$ or one of the intermediate output reactive power margins $Q_{pbmdd1}$ to $Q_{pbmdd3}$ instead of the maximum output reactive power margin $Q_{pbmax}$. If an inverter experiences an increase in the output reactive power margin $Q_{pb}$ and has room to increase reactive power Q, the inverter can be selected as the specific inverter.

According to the above embodiment, the PPC 6 gives the reactive power increasing command value to the specific inverter 15 so that the specific inverter 15 outputs reactive power Q up to a maximum degree of reactive power Q which the specific inverter 15 can output. As a result, the specific inverter 15 can output reactive power Q as much as possible. As a result, it is possible to obtain an opportunity to operate the inverters 11 to 14 other than the specific inverter 15 in a state where the power factor is as close as possible to 1.0. However, as a modification, reactive power Q from the specific inverter 15 may not be maximized but may be increased to a value slightly lower than the maximum value. In this case, a burden on increase in reactive power Q may be increased in some of the other inverters 11 to 14.

The PPC 6 is configured so as to perform looping processing of steps S112 to S115 to determine an increasing amount of reactive power in the order from the inverter 11 having the smallest output reactive power margin $Q_{pb}$, among the other inverters 11 to 14, until the power factor determined by the high-order command value PFref is achieved in the entire site of the power generation system 10. According to the embodiment, the processing of the step S108 causes the specific inverter 15 to accept a burden on more reactive power. Each of the other inverters 11 to 14 can bear a "shortage reactive power" which cannot be covered only by the specific inverter 15 which responds to the reactive power increasing command value. As a modification, contrary to the routine of FIG. 4, the amount of increase of reactive power may be determined in order from the inverter 14 having a relatively larger output reactive power margin $Q_pb$ among the other inverters 11 to 14.

In the power generation system 10 according to the embodiment, the number of inverters may be at least two. The number of inverters may be any number of five or more, and may be less than five, i.e., four or three. The number of identifiers in step S103 may be appropriately adjusted in accordance with the number of inverters.

REFERENCE SIGNS LIST 11 to 15, 101, 102, 201, 202 Inverter
21 to 25 Photovoltaic cell array
1 Power conditioner
3 Transformer
4 Site meter (SM)
5 Electric power grid
6 Power plant controller (PPC)
7 Power distributor (PD)
10, 100, 200 Power generation system
PQ1 to PQ4 Active-reactive power command
$Q_{pb}$, $Q_{pb1}$ to $Q_{pb5}$ Output reactive power margin

The invention claimed is:

1. A power generation system, comprising:
a plurality of photovoltaic cell panels for outputting DC power;
a plurality of inverters for converting the DC power into AC power; and
a high-order device for communicating with the plurality of inverters,
wherein the high-order device is configured to transmit a command value to each of the plurality of inverters so that a predetermined power factor set in advance is achieved by a total output of the plurality of inverters,
wherein each of the plurality of inverters is configured to control an output amount of active power and an output amount of reactive power based on a received command value, and
wherein the high-order device is configured
to transmit, to a specific inverter having room to increase the output amount of reactive power among the plurality of inverters, a reactive power increasing command value for increasing reactive power, and
to transmit, to at least one of the plurality of inverters other than the specific inverter, an active power increasing command value for increasing active power and decreasing reactive power,
wherein the plurality of inverters includes three or more inverters,
wherein the high-order device is configured to acquire a magnitude of an output reactive power margin, the output reactive power margin is a maximum value of reactive power which each of the plurality of inverters can output,
wherein the high-order device is configured to determine a largest output reactive power margin inverter having a largest output reactive power margin among the three or more inverters,
wherein the high-order device is configured to set the largest output reactive power margin inverter as the specific inverter, and
wherein the high-order device is configured to determine an increase amount of reactive power in order from an inverter whose output reactive power margin is smallest among other inverters other than the largest output reactive power margin inverter until the predetermined power factor is achieved.

* * * * *